United States Patent
Fadel

(10) Patent No.: US 6,394,182 B1
(45) Date of Patent: May 28, 2002

(54) OIL-GAS SEPARATING METHOD AND BOTTOM-HOLE SPIRAL SEPARATOR WITH GAS ESCAPE CHANNEL

(75) Inventor: André Luiz Da Fonseca Fadel, Rio De Janeiro (BR)

(73) Assignee: Petroleo Brasileiro S.A. - Petrobras (BR)

( * ) Notice: Subject to any disclaimer, the term of this patent is extended or adjusted under 35 U.S.C. 154(b) by 0 days.

(21) Appl. No.: 09/543,862

(22) Filed: Apr. 5, 2000

(30) Foreign Application Priority Data

Jun. 8, 1999 (BR) ............................................. 9901811

(51) Int. Cl.[7] ............................................. E21B 43/38
(52) U.S. Cl. .................................... 166/265; 166/105.5
(58) Field of Search ................................ 166/265, 266, 166/105.5

(56) References Cited

U.S. PATENT DOCUMENTS

| | | | | | |
|---|---|---|---|---|---|
| 2,652,130 | A | * | 9/1953 | Ferguson | 166/265 |
| 4,531,584 | A | * | 7/1985 | Ward | 166/265 |
| 5,482,117 | A | * | 1/1996 | Kolpak et al. | 166/265 |
| 5,560,744 | A | | 11/1996 | Weingarten et al. | 96/157 |
| 5,570,744 | A | | 11/1996 | Weingarten et al. | 166/357 |
| 5,698,014 | A | | 12/1997 | Cadle et al. | 166/357 |
| 6,066,193 | A | * | 5/2000 | Lee | 166/105.5 |
| 6,179,056 | B1 | * | 1/2001 | Smith | 166/313 |
| 6,189,614 | B1 | * | 2/2001 | Brady et al. | 166/266 |

* cited by examiner

*Primary Examiner*—William Neuder
(74) *Attorney, Agent, or Firm*—Nixon & Vanderhye PC

(57) ABSTRACT

This invention relates to a separator for the bottom of an oil production well with a channel for the escape of gas which has the function of providing a free path for the flow of gas which might be trapped in the separating channel due to possible flooding in the region of the separation inlet.

5 Claims, 2 Drawing Sheets

OIL-GAS SEPARATING METHOD AND BOTTOM-HOLE SPIRAL SEPARATOR WITH GAS ESCAPE CHANNEL

FIELD OF THE INVENTION

This invention has application in the field of static separators of the spiral type fitted in vertical tubular conduits, preferably at the bottom of oil wells.

1. Prior Art

The oil produced from wells in productive oilfields is always accompanied by a gas fraction forming a two phase fluid mixture. This gas either comes out of solution when the pressure is reduced as the mixture flows from the reservoir to the well, or is already present in the form of free gas at the reservoir pressure and temperature.

When the pressure in a stratum of oil is not sufficient to raise the fluids produced up to the surface with the desired rate of flow, production wells are equipped with means for effecting some method of artificial lifting.

Depending on the characteristics of the well and of the oil produced, the pumps used for pumping from below ground by one of said methods of artificial lifting may be (i) of the SCP (submerged centrifugal pumping) type, using multiple stage centrifugal pumps, or (ii) of the PCP (progressive cavity pumping) type using volumetric pumps, or (iii) of the MP (mechanical pumping) type using volumetric pumps of the suction type.

Entry of gas into any of these pumps reduces the volumetric efficiency of pumping in pumps of the alternating or progressive cavity type and causes cavitation in centrifugal pumps, to the extent that the fluid suction is reduced to zero if there is, in the pump inlet, in excess of a particular volumetric percentage of free gas which percentage is specific to each pumping system. The existence of problems of the nature of those mentioned above which can occur in pumping systems brings about a drastic decrease in the time between pump failures, significantly increasing the operating costs of these systems.

Multistage separators are used at the bottom of oil wells to avoid or minimize the entry of free gas into a pump, maximizing its volumetric pumping efficiency.

There is abundant literature on designs of separators for use upstream of bottom-hole pumps, with a profusion of patents and articles concerning the subject, indicating that no separator with a satisfactory performance has yet been obtained. Some of the separators use one or several spiral channels to let down the fluid, mounted internally to make use of the centrifugal effect and the increase in the fluid's residence time within the separator, which implies an increase in separation efficiency. One example of a type of spiral separator can be found in U.S. Pat. No. 5,570,744 by the Atlantic Richfield Company. Nevertheless, in general these separators have a chronic problem with trapping of the gas which separates out within the channels due to flooding of the fluid inlet region. U.S. Pat. No. 5,698,014 by the same Atlantic Richfield Company describes a possible solution to the abovementioned problem with the inclusion, in a separator, of an element which stops the flow of fluid in the gas discharge duct and is connected to a floating actuating member, which closes off the inlet duct whenever the build-up of liquid reaches a very high level within the said separator, using cooperating telescopic members linked to the support of the stop member and the floating actuator member, with a spring placed between them to absorb impacts, but with an increase in failure-prone mechanical devices.

2. Object of the Invention

It is an object of this invention to provide a spiral separator at the bottom of an oil producing well with a channel for the escape of gas, which has the function of providing a free path for the flow of gas which is occasionally trapped in the separating channel due to possible flooding in the vicinity of the separator inlet.

SUMMARY OF THE INVENTION

A first aspect of this invention relates to a bottom-hole spiral separator in an oil production well with a channel for the escape of gas which has the function of providing a free path for the flow of gas which is trapped from time to time in the separating channels due to possible flooding of the separator inlet region.

The fluid which is to be separated is collected or transported, by means of a helical capture device along which separation takes place, to an inlet pipe connected to a pump. The introduction of another section which is identical to that of the helicoidal capture device provides a kind of channel for the escape of separated gas, which can sometimes become trapped when the inlet region for the fluid which is to be separated becomes flooded.

The invention also provides a method of separating a multi-phase fluid flow from an oil producing well into a liquid phase and a gaseous phase, comprising placing a spiral separator according to the first aspect, such that the multiphase fluid enters said spiral separator through the inlet region and enters via a separating channel, causing the multiphase fluid to flow through said separating channel as a result of the suction from a pump connected to the production pipe, and operating the pump of a rate such that the velocity of the multiphase fluid flowing through helicoidal separating channel provides sufficient centrifugal force for the gaseous phase to be separated from the liquid phase, wherein once the liquid phase has been separated from the gaseous phase the gaseous phase coalesces and rises, and accumulates in the upper region of the separating channel, wherein the more fluid phase continues on its path in the direction of the inner lower part of said shell of the spiral separator, accumulates in the fluid phase region, is captured by production pipe and is conveyed to the pump inlet, and wherein the gaseous phase enters through the gas channel and flows to its outlet at the top of the extension of the gas channel above the inlet region for multiphase fluid.

BRIEF DESCRIPTION OF THE DRAWINGS

The characteristics of the bottom-hole spiral separator for oil producing wells with a channel for the escape of gas, and the oil-gas separating method, to which this invention relates will be better understood from the following detailed description below associated merely by way of example with the drawings referred to below, which form an integral part of this description.

DETAILED DESCRIPTION OF THE PREFERRED EMBODIMENT

The detailed description of the bottom-hole spiral separator for oil production wells with a channel for the escape of gas to which this invention relates will be provided in accordance with the identification of its constituent components based on the Figures described above.

This invention relates to a bottom-hole spiral separator of the static type for oil production wells with a channel for the escape of gas which has the function of providing a free path for the flow of a gaseous phase separated from a multiphase fluid which occasionally becomes trapped in the separating channels due to possible flooding in the separator inlet region.

Figure 1:
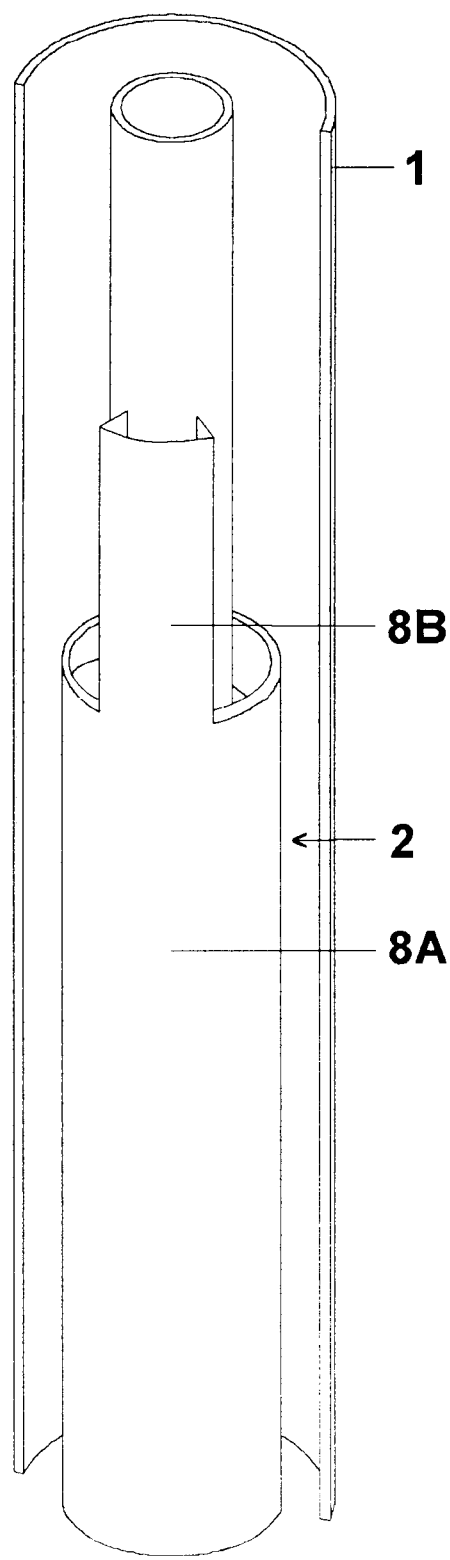
FIG. 1 shows a perspective and cross-sectional view of an oil producing well in which an embodiment of a separator of the spiral type according to this invention can be seen.

FIG. 1 shows a cross-sectional and perspective view of an oil production well (1) in which can be seen an embodiment of a separator of the spiral type (2) according to this invention.

Figure 2:
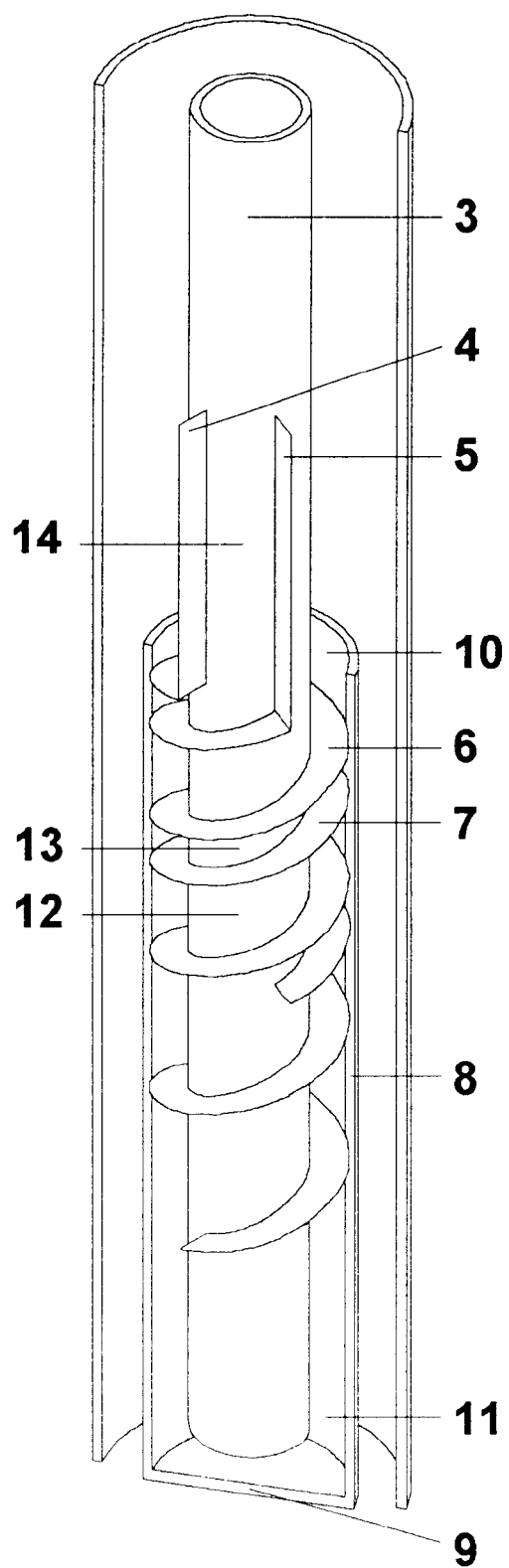
FIG. 2 shows a perspective and cross-sectional view of both an oil producing well and an embodiment of a separator of the spiral type according to this invention.

FIG. 2 shows a cross-sectional and perspective view of an embodiment of a spiral separator according to this invention.

It will be seen that the separator comprises:

a production pipe (3), connected at its upper end to the inlet to a downhole pump (not shown) which serves to carry a substantially liquid phase separated from a multiphase fluid to the inlet to the said pump, at least one first flat laminar section (4) rigidly connected vertically by its inner lateral end to the outer surface of production pipe (3), at least one second flat laminar section (5) at a distance from the first flat laminar section (4), also rigidly connected vertically by its inner lateral end to the outer surface of production pipe (3), at least one descending first helicoidal laminar section (6) rigidly connected by its upper end to the bottom of the first flat laminar section (4) and by its inner lateral end to the outer surface of production pipe (3), and serving to transport the phases of a multiphase fluid and to separate them along its length, at least one descending second helicoidal laminar section (7) rigidly attached by its upper end to the bottom of second flat laminar section (5) and by its inner lateral end to the outer surface of production pipe (3), said descending second helicoidal laminar section being located between the pitches of the screw formed by first helicoidal laminar section (6), and being shorter than the length of first helicoidal laminar section (6) and serving to carry the gaseous phase separated from the multiphase fluid, a shell (8) which has a cylindrical wall (8A) (shown in FIG. 1) in its lower part which encloses first helicoidal laminar section (6) and second helicoidal laminar section (7), is rigidly attached to the outer lateral ends of the second helicoidal laminar section (7) by means of its inner surface, is open at the top, and is closed by a circular wall (9) at the bottom, said shell having in its upper part, intimately attached to the top of cylindrical wall (8A), a wall of circumferential cross section (8B) (also shown in FIG. 1) having the same radius as cylindrical wall (8A), and being rigidly attached to the outer lateral end of first vertical section (3) and the outer lateral end of second vertical section (4), an inlet region (10) for multiphase fluid formed by the open part of the top of cylindrical wall (8A) of shell (8), which serves to allow entry of the multiphase fluid which is to be separated, and a fluid phase region (11) located at the base of cylindrical part (8A) of shell (8) formed by the junction between the cylindrical part (8a) and the circular wall (9) and serving to concentrate the substantially more liquid fluid phase captured by the production pipe (3).

The junction between cylindrical part (8A) of shell (8) and helicoidal laminar sections (6) and (7) and between the sections (6) and (7) and the production pipe (3) forms:

a separating channel (12) located between the upper surface of first helicoidal section (6) and the lower surface of second helicoidal section (7), and a gas channel (13) located between the lower surface of first helicoidal section (6) and the upper surface of second helicoidal section (7).

The junction between the arcuate part of the circumference (8B) of shell (8) and vertical laminar sections (4) and (5) and between the sections (4) and (5) and the production pipe (3) forms an extension to gas channel (14) up to a region above inlet region (10) for multiphase fluid.

The spiral separator (2) is located at the bottom of an oil producing well (1). The multiphase fluid enters the spiral separator (2) through inlet region (10) and enters the separating channel (12). As a result of the suction from the pump connected to production pipe (3) the fluid flows through the separating channel (12). The velocity of the multiphase fluid flowing through this helicoidal separating channel (12) provides sufficient centrifugal force for the gaseous phase to be separated from the liquid phase. Once the liquid phase has been separated from the gaseous phase, the natural tendency is for the gaseous phase to coalesce and to rise, despite the carrying force of the fluid phase generally being large, so that it accumulates in the upper part of the separating channel (12). The more fluid phase will continue on its path in the direction of the inner lower part of shell (8) of spiral separator (2), will accumulate in the fluid phase region (11) and will be captured by production pipe (3) and conveyed to the pump inlet.

The gaseous phase continues on its upward path, enters gas channel (13) and flows to its outlet at the top of the extension (14) of the gas channel above the inlet region (10) for multiphase fluid.

Even if there is flooding such as to cause multiphase fluid to enter the gas channel (13), the flow of multiphase fluid also has the gaseous phase separated from the liquid phase not only as a result of the centrifugal effect but as a result of the longer residence time for the multiphase fluid within spiral separator (2).

The above description of the spiral bottom-hole separator of this invention with a channel for the escape of gas must only be regarded as one possible embodiment and any special features included therein must be regarded only as features which have been described in order to aid understanding. Thus they cannot in any way be regarded as restricting the invention, which is only restricted to the scope of the following claims.

What is claimed is:

1. Static spiral separator for separating phases of a multiphase fluid at a bottom of an oil production well, comprising:

a production pipe for carrying a substantially liquid phase separated from said multiphase fluid to an upper end thereof, at least one first flat laminar section rigidly connected vertically by an inner lateral edge thereof to an outer surface of said production pipe, at least one second flat laminar section at a distance from the first flat laminar section and also rigidly connected vertically by an inner lateral edge thereof to the outer surface of the production pipe, at least one descending first helicoidal laminar section rigidly connected by an upper end thereof to a bottom of the first flat laminar section and by an inner lateral edge thereof to the outer surface of said production pipe, and serving to transport the phases of said multiphase fluid and to separate them along a length thereof, at least one descending second helicoidal laminar section, rigidly attached by an upper end thereof to a bottom of said second flat laminar section and by an inner lateral edge thereof to the outer surface of said production pipe, said second helicoidal laminar section being located between pitches of a screw formed by said first helicoidal laminar section, having a length shorter than the length of said first helicoidal laminar section, and serving to carry a gaseous phase separated from the multiphase fluid, a shell having a first cylindrical wall part at a lower part thereof which encloses said first helicoidal laminar section and said second helicoidal laminar section, is rigidly attached to outer lateral edges of the first and second helicoidal laminar sections by means of an inner surface thereof, is open at a top thereof and closed by a circular wall at a bottom thereof, the shell having at an upper part thereof, a second cylindrical wall part attached to the top of the first cylindrical wall part, the second cylindrical wall part having a circumferential cross section having a same radius as the first cylindrical wall part and rigidly attached to the outer lateral edge of the first flat laminar section and the outer lateral edge of the second flat laminar section, an inlet region for said multiphase fluid, formed by the opening the first cylindrical wall part of the shell, which serves to admit the multiphase fluid which is to be separated, and a fluid phase region located at a base of said first cylindrical wall part of said shell formed by a junction between the first cylindrical wall part and the circular wall and serving to concentrate a substantially more liquid fluid phase captured by the production pipe.

2. A spiral separator according to claim 1, wherein a junction between said first cylindrical wall part of the shell and said first and second helicoidal laminar sections forms:

a separating channel located between an upper surface of said first helicoidal laminar section and a lower surface of said second helicoidal laminar section, and a gas channel located between a lower surface of said first helicoidal laminar section and an upper surface of said second helicoidal laminar section.

3. A spiral separator according to claim 1, wherein a junction between an arcuate part of a circumference of said shell and the first and second flat laminar sections forms an extension to said gas channel up to a region above said inlet region for said multiphase fluid.

4. A method of separating a multi-phase fluid flow from an oil producing well into a liquid phase and a gaseous phase, comprising:

providing a spiral separator for separating the phases of a multiphase fluid at the bottom of oil production wells, that includes:

a production pipe for carrying a substantially liquid phase separated from said multiphase fluid to an upper end thereof, at least one first flat laminar section rigidly connected vertically by an inner lateral edge thereof to an outer surface of said production pipe, at least one second flat laminar section at a distance from the first flat laminar section and also rigidly connected vertically by an inner lateral edge thereof to the outer surface of the production pipe, at least one descending first helicoidal laminar section rigidly connected by an upper end thereof to a bottom of the first flat laminar section and by an inner lateral edge thereof to the outer surface of said production pipe, and serving to transport the phases of said multiphase fluid and to separate them along a length thereof, at least one descending second helicoidal laminar section, rigidly attached by an upper end thereof to a bottom of said second flat laminar section and by an inner lateral edge thereof to the outer surface of said production pipe, said second helicoidal laminar section being located between pitches of a screw formed by said first helicoidal laminar section, having a length shorter than the length of said first helicoidal laminar section, and serving to carry a gaseous phase separated from the multiphase fluid, a shell having a first cylindrical wall part at a lower part thereof which encloses said first helicoidal laminar section and said second helicoidal laminar section, is rigidly attached to outer lateral edges of the first and second helicoidal laminar sections by means of an inner surface thereof, is open at a top thereof and closed by a circular wall at a bottom thereof, the shell having at an upper part thereof, a second cylindrical wall part attached to the top of the first cylindrical wall part, the second cylindrical wall part having a circumferential cross section having a same radius as the first cylindrical wall part and rigidly attached to the outer lateral edge of the first flat laminar section and the outer lateral edge of the second flat laminar section, an inlet region for said multiphase fluid, formed by the opening of the first cylindrical wall part of the shell, which serves to admit the multiphase fluid which is to be separated, and a fluid phase region located at a base of said first cylindrical wall part of said shell formed by a junction between the first cylindrical wall part and the circular wall and serving to concentrate a substantially more liquid fluid phase captured by the production pipe, wherein a junction between said first cylindrical wall part of the shell and said first and second helicoidal laminar sections forms:

a separating channel located between an upper surface of said first helicoidal laminar section and a lower surface of said second helicoidal laminar section, and a gas channel located between a lower surface of said first helicoidal laminar section and an upper surface of said second helicoidal laminar section, placing the spiral separator at the bottom of an oil-producing well, such that the multiphase fluid enters said spiral separator through the inlet region and enters via said separating channel, causing the multiphase fluid to flow through said separating channel as a result of suction from a pump connected to the production pipe, and operating the pump at a rate such that a velocity of the multiphase fluid flowing through helicoidal separating channel provides sufficient centrifugal force for the gaseous phase to be separated from the liquid phase, wherein once the liquid phase has been separated from the gaseous phase the gaseous phase coalesces and rises, and accumulates in an upper region of the separating channel, wherein the more fluid phase continues in a direction of an inner lower part of said shell of the spiral separator, accumulates in the fluid phase region, is captured by the production pipe and is conveyed to the pump, and wherein the gaseous phase enters through the gas channel and flows to an outlet thereof at a top of an extension of the gas channel above the inlet region for said multiphase fluid.

5. A method according to claim 4, wherein during the flow of said multiphase fluid to achieve separation of the gaseous phase from the liquid phase by means of the centrifugal effect, separation is assisted by the longer residence time for the multiphase fluid within the spiral separator when multiphase fluid is caused to enter the gas channel as a result of flooding.

* * * * *